United States Patent
Xie

(10) Patent No.: US 8,005,360 B2
(45) Date of Patent: Aug. 23, 2011

(54) PMDC FEEDBACK SIGNAL FOR ALTERNATE POLARIZATION DPSK SYSTEM

(75) Inventor: Chongjin Xie, Morganville, NJ (US)

(73) Assignee: Alcatel Lucent, Paris (FR)

(*) Notice: Subject to any disclaimer, the term of this patent is extended or adjusted under 35 U.S.C. 154(b) by 578 days.

(21) Appl. No.: 12/185,944

(22) Filed: Aug. 5, 2008

(65) Prior Publication Data

US 2010/0034541 A1 Feb. 11, 2010

(51) Int. Cl.
H04B 10/00 (2006.01)
H04B 10/04 (2006.01)
H04B 10/12 (2006.01)
H04J 14/02 (2006.01)
H04J 14/06 (2006.01)

(52) U.S. Cl. ........... 398/65; 398/81; 398/147; 398/159; 398/194

(58) Field of Classification Search ............ 398/29, 398/33, 65, 81, 147, 152, 184, 192, 194
See application file for complete search history.

(56) References Cited

U.S. PATENT DOCUMENTS 7,844,186 B2 * 11/2010 Dorrer et al. .................. 398/184
2003/0156776 A1 * 8/2003 Han et al. ........................ 385/11

FOREIGN PATENT DOCUMENTS

| EP | 0 909 045 A2 | 4/1999 |
| EP | 0 909 045 A3 | 1/2004 |
| EP | 0 909 045 B1 | 6/2006 |
| EP | 1 860 802 A1 | 11/2007 |
| WO | PCT/US2009/004139 | 10/2009 |

OTHER PUBLICATIONS

Schmidt, M. et al., "Adaptive PMD compensation for 170 Gbit/s RZ transmission systems with alternating polarisation", 2005 Optical Fiber Communications Conference Technical Digest, Mar. 6, 2005, pp. 468-470, vol. 3, IEEE Piscataway, NJ USA.

* cited by examiner

*Primary Examiner* — Dalzid Singh
(74) *Attorney, Agent, or Firm* — David M. LaBruno

(57) ABSTRACT

A feedback signal indicative of the average RF power of an APol-DPSK optical signal is used by a PMD compensator to adjust the amount of compensation applied to the optical signal.

21 Claims, 4 Drawing Sheets

PMDC FEEDBACK SIGNAL FOR ALTERNATE POLARIZATION DPSK SYSTEM

FIELD OF THE INVENTION

This invention is related generally to the field of optical communications and in particular to a polarization mode dispersion (PMD) compensation feedback signal and accompanying method for alternately polarized differential phase shift keyed (APol-DPSK) transmission formats.

BACKGROUND OF THE INVENTION

Concurrent with the development of contemporary optical communications systems, a number of useful transmission formats have been developed and deployed. One such format is the Alternately Polarized-Return to Zero-Differential Phase Shift Keyed (APol-RZ-DPSK) format.

SUMMARY OF THE INVENTION

According to an aspect of the present invention, a feedback signal is generated for use in providing PMD compensation to an APol-RZ-DPSK formatted signal. A polarization scrambler or polarization controller is used at the transmitter side of an optical communications system to change the transmission (launching) polarization state of optical signals in a random or pre-determined way. A one-bit delay interferometer is used at the receiving side of the optical communications system in conjunction with a balanced detector or a single-ended detector to produce the feedback signal which—according to an aspect of the present invention—is the average RF power from the balanced detector or single-ended detector.

BRIEF DESCRIPTION OF THE DRAWING

A more complete understanding of the present invention may be realized by reference to the accompanying drawings in which.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

Figure 1:
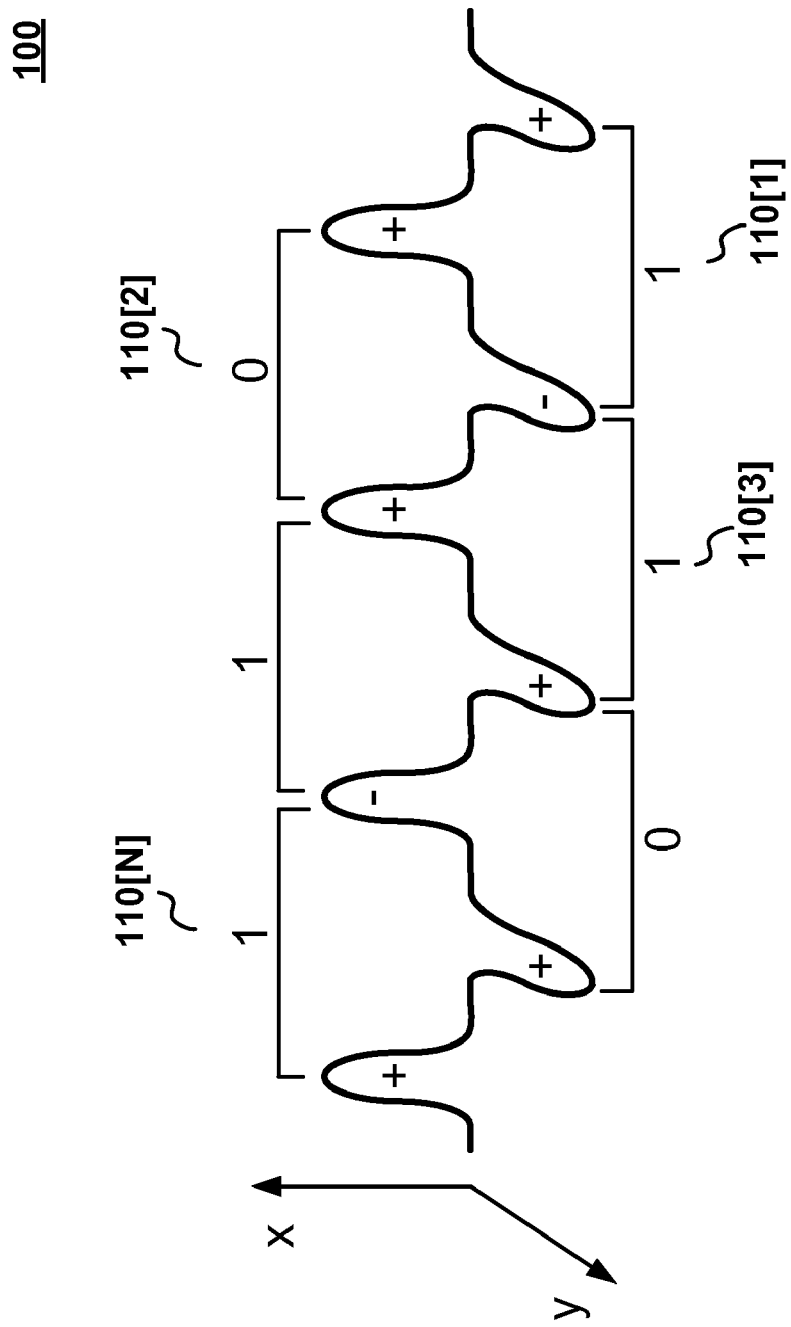
FIG. 1 is a schematic diagram of a representative APol-RZ-DPSK optical signal.

By way of some additional background, and with initial reference to FIG. 1, there is shown a representative APol-RZ-DPSK Signal 100. From this FIG. 1, it may be observed that the signal 100 comprises a series of bits 110[1], 110[2], 110[3] . . . 110[N] in which adjacent bits have orthogonal polarizations. As known in the art, signals exhibiting such a format exhibit a high tolerance to nonlinearities, thereby encouraging their use in particular applications, for example 40G submarine systems. In addition, such an APol-DPSK format typically requires a 2-bit delay line interferometer and a 2-bit DPSK precoder. Finally polarization mode dispersion (PMD) performance is generally worse for such APol-DPSK signals than other signal formats exhibiting only single polarization. To increase the tolerance of signals such as 100 to PMD, polarization mode dispersion compensation (PMDC) must be used.

Figure 2:
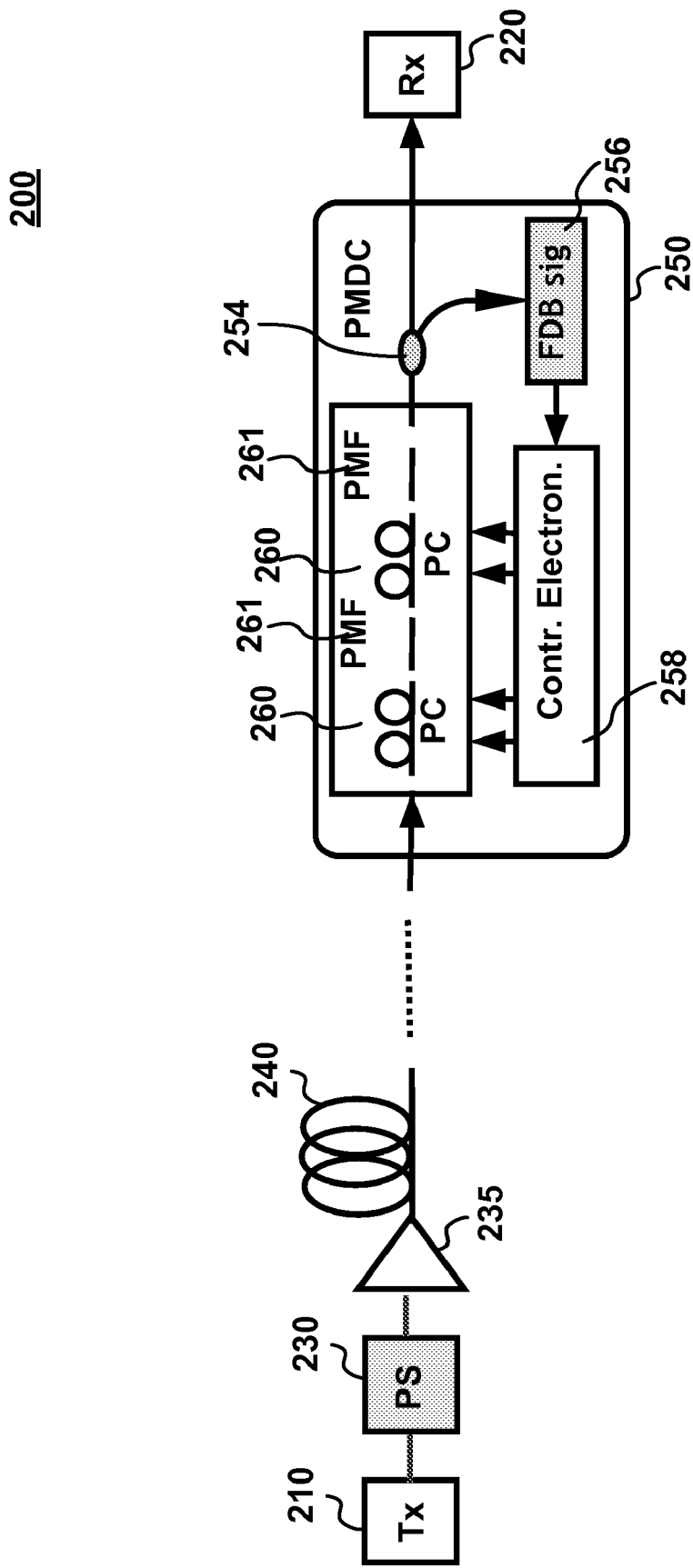
FIG. 2 is a schematic diagram of an optical transmission system with an optical PMD compensator according to an aspect of the present invention.

Turning now to FIG. 2, there is shown a schematic diagram of an optical transmission system with an optical PMD compensator 200 according to an aspect of the present invention. Generally speaking, optical signals (not specifically shown) are generated at the originating end of the transmission system through the effect of transmitter 210, and subsequently received by receiver 220 at the destination end of the transmission system.

Upon generation, the optical signals have their polarization(s) scrambled or otherwise controlled through the effect of a polarization scrambler or polarization controller 230, are then amplified through the effect of one or more amplifiers 235 and then launched into the transmission system having one or more fiber spans 240. The polarization scrambler or polarization controller 230 changes the launching polarization state of the optical signals in a random or pre-determined manner At the destination end of the transmission system, a polarization mode dispersion compensator 250 (PMDC) compensates received optical signals for PMD effects produced during transmission of the optical signals—which are then received by the receiver 220. In a representative embodiment according to an aspect of the present invention, the PMDC 250 has one or more polarization controllers 260 and one or more differential group delay (DGD) devices 261, which are polarization maintaining fibers (PMFs) in the figure.

Upon receipt, the optical signals are split through the effect of an optical splitter 254 and whereby the split signals are directed into feedback signal generator 256, the output of which is provided to compensator control electronics 258 which in turn controllably adjusts the amount of compensation introduced by the polarization controllers 260 and PMFs 261. According to an aspect of the present invention, the feedback signal generated by the feedback signal generator 256 is the average RF power of the received optical signal.

Figure 3A:
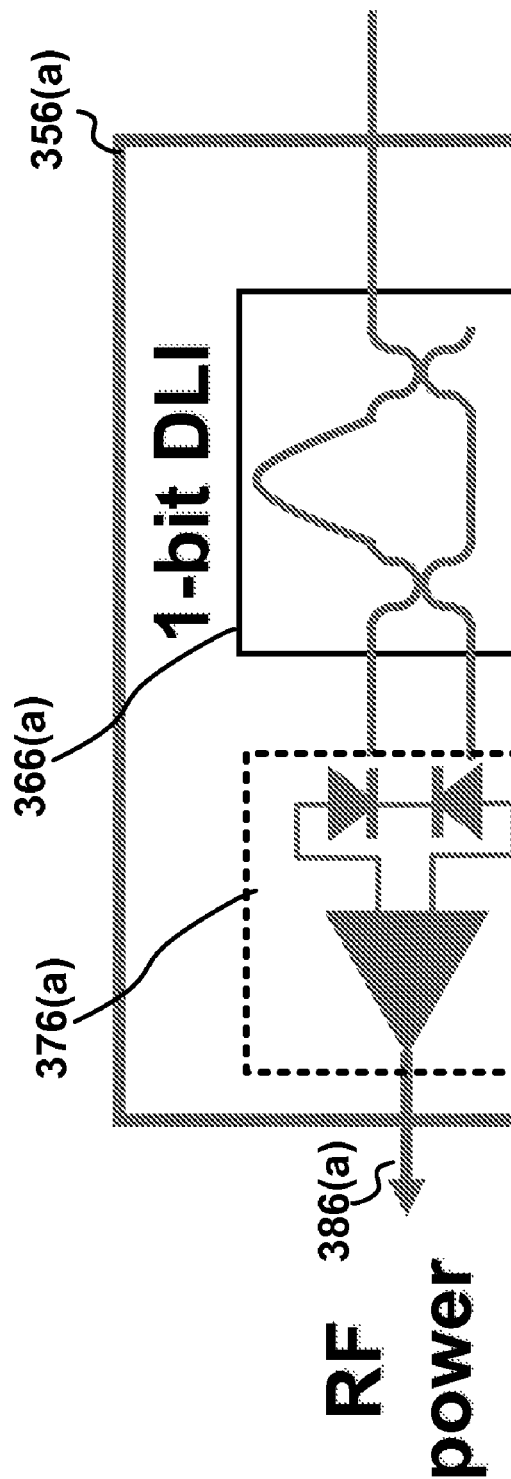
FIG. 3(a) is a schematic diagram of a feedback signal generator according to an aspect of the present invention.

FIG. 3(a) is a schematic of a representative feedback signal generator according to an aspect of the present invention. More particularly, the feedback signal generator 356(a) comprises a 1-bit delay line interferometer 366(a) the outputs of which are directed to a balanced detector 376(a) which in turn produces feedback signal output 386(a) which as we have already noted is the average RF power of the received optical signal.

Figure 3B:
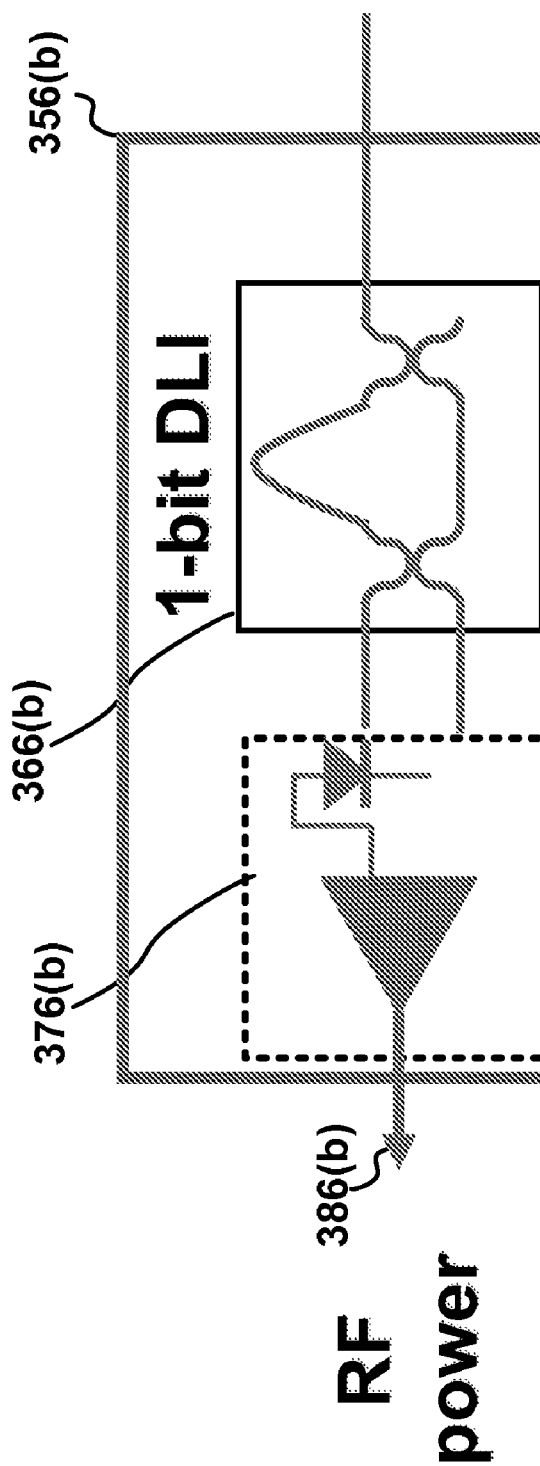
FIG. 3(b) is a schematic diagram of an alternative feedback signal generator according to an aspect of the present invention.

FIG. 3(b) is a schematic of an alternative representative feedback signal generator according to an aspect of the present invention. More particularly, the feedback signal generator 356(b) comprises a 1-bit delay line interferometer 366(b) an output of which is directed into a single ended detector 376(b) which in turn produces feedback signal output 386(b) which is the average RF power of the received optical signal.

At this point, while I have discussed and described the invention using some specific examples, those skilled in the art will recognize that our teachings are not so limited. In particular, while I have described a 1 bit delay interferometer, the actual delay difference between two paths of such an interferometer may advantageously be from 20% to 180% of the bit period. Accordingly, the invention should be only limited by the scope of the claims attached hereto.

The invention claimed is:

1. A method of polarization mode dispersion (PMD) compensation for an alternately polarized-return to zero-differential phase shift keyed (APol-RZ-DPSK) optical signal, the method comprising:
    receiving an APol-RZ-DPSK signal whose polarization varies;
    generating a PMD compensation feedback signal indicative of the average RF power of the received APol-RZ-DPSK signal; and
    compensating, through the effect of a polarization mode dispersion compensator (PMDC), PMD of the received APol-RZ-DPSK signal wherein the PMDC adjusts the amount of compensation in response to the generated PMD compensation feedback signal,
    wherein the PMD compensation feedback signal is based on an output of a delay line interferometer (DLI) to which a portion of the APol-RZ-DPSK signal is introduced.

2. The method of claim 1 wherein said generating comprises:
    introducing the portion of the APol-RZ-DPSK signal into the delay line interferometer (DLI); and
    detecting the output of the DLI through the effect of a detector which generates a compensation feedback signal indicative of the average RF power of the APol-RZ-DPSK signal.

3. The method of claim 2 wherein said detector is a balanced detector.

4. The method of claim 2 wherein said detector is a single ended detector.

5. The method of claim 2 wherein the DLI has two paths and wherein the delay between the two paths is from 20% to 180% of a symbol period.

6. The method of claim 2 wherein the DLI is a 1-symbol DLI.

7. The method of claim 1 wherein the average RF power is the average RF power over any bandwidth.

8. The method of claim 1, further comprising
    generating the APol-RZ-DPSK optical signal;
    varying a launching polarization state of the generated APol-RZ-DPSK optical signal; and
    transmitting the varied APol-RZ-DPSK signal.

9. The method of claim 8 wherein said varying is performed through the effect of a polarization scrambler.

10. The method of claim 8 wherein said varying is performed through the effect of a polarization controller which changes input state of polarization of the generated APol-RZ-DPSK signal in a pre-determined sequence.

11. In an optical communications system employing an Alternately Polarized Differential Phase Shift Keying (APol-DPSK) transmission format for optical signals, a method of producing a polarization mode dispersion compensation feedback signal, the method comprising:
    receiving APol-DPSK optical signal; and
    directing at least a portion of the APol-DPSK signal into a feedback signal generator comprising a delay line interferometer and a detector wherein the APol-DPSK signal is first directed into the delay line interferometer the output of which is directed into the detector thereby producing the polarization mode dispersion compensation feedback signal indicative of average RF power of the APol-DPSK signal.

12. The method of claim 11 wherein a delay between the two paths in the delay line interferometer is from 20% to 180% of a symbol period and the RF power is the power over any bandwidth.

13. The method of claim 12 further comprising
    transmitting a plurality of the APol-DPSK optical signals, wherein a launching polarization state of the APol-DPSK optical signals varies in a random or pre-determined manner.

14. The method of claim 12 wherein the delay line interferometer is one symbol delay line interferometer.

15. An apparatus comprising:
    at least one compensating device for adjusting polarization mode dispersion compensation of an APol-RZ-DPSK signal based on a feedback signal; and
    a feedback generator for generating the feedback signal based on a first portion of the compensated APol-RZ-DPSK signal, the feedback generator including
        a delay line interferometer (DLI) to which the first portion is introduced, the feedback signal based on an output of the DLI and indicative of the average RF power of the compensated APol-RZ-DPSK signal.

16. The apparatus of claim 15 further comprising:
    an optical splitter for splitting the compensated APol-RZ-DPSK signal into the first portion and a second portion.

17. The apparatus of claim 15 wherein the compensating device is a polarization controller.

18. The apparatus of claim 15 wherein the compensating device further includes a differential group delay (DGD) device.

19. The apparatus of claim 15 wherein the feedback generator further includes
    a detector for generating the feedback signal based on the output of the DLI.

20. The apparatus of claim 15 wherein the DLI has a delay between the two paths in the DLI that is from 20% to 180% of a symbol period of the APol-RZ-DPSK signal.

21. The apparatus of claim 15 further comprising:
    a receiver for recovering data from the compensated APol-RZ-DPSK signal.

* * * * *